United States Patent [19]
Osaheni et al.

[11] Patent Number: 5,652,017
[45] Date of Patent: Jul. 29, 1997

[54] METHOD FOR RENDERING INORGANIC POWDER HYDROPHOBIC

[75] Inventors: John Aibangbee Osaheni, Niskayuna; Stanlee Teresa Buddle, Gloversville; John Peter Banevicius, Albany; Slawomir Rubinsztajn, Schenectady; Michael Lee White; Larry Allen Divins, both of Clifton Park, all of N.Y.

[73] Assignee: General Electric Company, Schnectady, N.Y.

[21] Appl. No.: 630,314

[22] Filed: Apr. 10, 1996

[51] Int. Cl.$^6$ ................................................. B05D 7/00
[52] U.S. Cl. ........................ 427/212; 427/213; 427/215
[58] Field of Search ................................ 427/213, 212, 427/215; 423/335–340; 106/490

[56] References Cited

U.S. PATENT DOCUMENTS 4,554,147 11/1985 Stoll et al. ........................ 423/335

*Primary Examiner*—Shrive Beck
*Assistant Examiner*—David M. Maiorana
*Attorney, Agent, or Firm*—William H. Pittman

[57] ABSTRACT

Inorganic powder, preferably fumed silica, is rendered hydrophobic by treatment with a silylating agent in the presence of a third reagent selected from the group consisting of protonic acids, especially those having a boiling point at atmospheric pressure up to 120° C., preferably formic acid, and linear phosphonitrilic halides, preferably linear phosphonitrilic chlorides.

16 Claims, No Drawings

METHOD FOR RENDERING INORGANIC POWDER HYDROPHOBIC

BACKGROUND OF THE INVENTION

The present invention relates to a method for treating inorganic powder with silylating agents in a batch or continuous manner, whereby the resulting inorganic powder is made hydrophobic.

Inorganic powders, such as fumed silica, are used as thickeners, thixotropics, and reinforcing agents in materials such as inks, resins, rubber, paints and cosmetics. More particularly, they are used to modify the properties, such as the physical, mechanical and thermal properties, of a variety of plastic and elastomeric products such as silicone rubbers.

Inorganic powders are also used as sorbents as disclosed in U.S. Pat. No. 5,037,557. For example, inorganic powders can be used to absorb hydrocarbons, such as oil, from water.

Untreated inorganic powder can have hydroxy groups on its surface that make it hydrophilic. In the case of silica, for example, said hydroxy groups are present as silanol groups. To be effective as a filler in organic systems or a sorbent for organic compounds, the inorganic powder must often be rendered hydrophobic. A method typical of the prior art is disclosed in U.S. Pat. No. 4,554,147. This procedure involves a pneumatically fluidized bed process that requires the use of a quantity in excess of stoichiometric amounts of a treating agent such as a cyclopolysiloxane, long residence times and high operating temperatures. The operating conditions of the prior art processes make treated hydrophobic inorganic powder very expensive. For example, treated fumed silica is one of the most expensive ingredients incorporated in silicone rubber products.

An economically desirable process for rendering inorganic powder hydrophobic would be one that operates at moderate temperatures with short residence times while using modest amounts relatively inexpensive treating agents. The present invention provides such a process.

The treated inorganic powder that results from the method of the instant invention can be substituted in applications that incorporate hydrophobic inorganic powders prepared by methods of the prior art. When the treated inorganic powder resulting from the method of the instant invention is incorporated into a final product, such as silicone rubber, properties of the final product, including physical, thermal and mechanical properties, are substantially unchanged from product that incorporates inorganic powder treated with methods of the prior art.

SUMMARY OF THE INVENTION

The present invention is a method for treating inorganic powder comprising contacting it with a silylating agent in the presence of a third reagent selected from the group consisting of protonic acids and linear phosphonitrilic halides.

DETAILED DESCRIPTION; PREFERRED EMBODIMENTS

The inorganic powder treated according to the invention can comprise any untreated inorganic material with hydroxy groups on its surface. Such powders and their methods of manufacture are well known in the art. They include materials such as silica, powdered glass, silicates, alumina, titania, alumina, asbestos, barium sulfate, zinc oxide, ferric oxide and zinc sulfide.

Preferably, the inorganic powder comprises amorphous silica. More preferably, it comprises fumed silica with 50–450 $m^2/g$ surface area and 0.1–1.0% by weight moisture content. For the sake of brevity, the inorganic powder is frequently designated as silica hereinafter; it should be understood, however, that other materials may be substituted for silica when appropriate.

Silylating agents which can be employed in the instant invention include polyorganosiloxanes, especially hexaorganodisiloxanes, in which the organic groups may be alkyl, fluoroalkyl, alkenyl or aryl and especially methyl; triorganosilyl compounds including mercaptans, acylates, amines and aminoxy compounds; and silazanes such as hexamethyldisilazane and 1,3-diphenylhexamethyldisilazane. Certain of the less reactive reagents, such as disiloxanes not containing other functional groups, can be efficiently utilized only with the use of linear phosphonitrilic halides as the third reagent, as explained more fully hereinafter. The preferred silylating agents in many instances are hexamethyldisilazane, trimethylsilanol and bis(trimethylsilyl) carbonate. Silylating agents having a boiling point lower than the temperature at which the silica is being processed (in other words, gas phase silylation) is especially preferred.

Among the most useful silylating agents are materials represented by the formula $[(R^1)_3Si]_aZ$, wherein each $R^1$ is independently an aromatic hydrocarbon, halogenated aromatic hydrocarbon, aralkyl, $C_{1-8}$ alkyl, $C_{2-8}$ alkenyl, $C_{1-8}$ haloalkyl or cycloalkyl radical; Z is hydroxy, $-N(R^2)_{2-a}$, $-SR^2$, $-O-$, $-S-$ or $OCOR^2$; $R^2$ is hydrogen or $R^1$ and a is 1 or 2. $R^2$ is preferably hydrogen, C1–8 alkyl or cycloalkyl.

Illustrative aromatic hydrocarbon and halogenated aromatic hydrocarbon radicals are phenyl, tolyl, xylyl, naphthyl, chlorophenyl and chloronaphthyl. Illustrative aralkyl radicals are benzyl and phenylethyl. Illustrative alkyl and haloalkyl radicals are methyl, ethyl, propyl, butyl, pentyl, hexyl, heptyl, octyl, chloropropyl and trifluoropropyl. Illustrative alkenyl radicals are vinyl, allyl and 1-propenyl. Illustrative cycloalkyl radicals are cyclobutyl, cyclopentyl and cyclohexyl.

The method of the invention requires the presence of a third reagent which may be a relatively volatile protonic acid or a linear phosphonitrilic halide. Suitable protonic acids include hydrochloric acid, carbonic acid, formic acid and acetic acid. Preferably, the acid has a boiling point at atmospheric pressure up to 120° C. Formic acid is preferred by reason of its particular effectiveness and relatively low cost. It may be employed in aqueous solution; for example, as an 88% (by weight) solution.

The preferred linear phosphonitrilic halides are the chlorides, hereinafter sometimes designated "LPNC". They have the formula $Cl_3P(NPCl_2)_nNPCl_3 \cdot PCl_6$, wherein n is 0–4 and preferably 0–2. The LPNC's can be made by procedures described in U.S. Pat. No. 3,839,388 incorporated herein by reference.

It is particularly surprising that the LPNC's function as catalysts in the method of this invention. Fumed silica contains minor proportions of water, and it is known that water causes decomposition of LPNC's. Therefore, the fact that said LPNC's can be employed for this purpose is unexpected.

The amount of silylating agent used in the method determines in part the degree of removal of silanol groups. A silanol group is considered removed when an active hydrogen therein is displaced by a silyl group of the formula $-Si(R^1)_3$. The more silylating agent utilized, the more surface silanol removal occurs. Preferably, an amount of silylating agent is utilized that is at least a stoichiometric quantity based on the proportion of surface silanol groups. This is in general in the range of about 4–200% by weight based on silica.

It is often preferred to mechanically fluidize the mixture of silica, silylating agent and third reagent. The fluidizing can be accomplished by any equipment known in the art which will provide thorough blending and constant mechanical agitation sufficient to suspend the silica particles in the volatilized silylating agent. The fluidizing can be conducted as a batch process or as a continuous process. Suitable fluidizing equipment comprises mixers which incorporate rotating impellers with various blade angles, kneading mixers, helical-blade mixers and screw mixers.

The reaction temperature is not critical; an illustrative range is about 25°–400° C. The temperature is most often above the boiling point of the silylating agent and below the inactivation temperature of an LPNC, if employed. Preferably, the temperature is in the range of about 100°–250° C. for protonic acid-containing systems and about 100°–150° C. for LPNC-containing systems.

Reaction time is dependent on the reaction conditions, including proportions and temperature. It is also dependent on the degree to which removal of surface silanol groups is desired. The longer the reaction is allowed to proceed, the greater the proportion of such groups that will be removed. With a higher fluidizing temperature, a shorter reaction time is required to achieve a desired level of silanol removal. The necessary level of silanol removal and the time and temperature parameters required to meet that level will be determinable by those skilled in the art.

The excess reagents and by-products can be stripped from the treated silica by any method, typically under vacuum. This may be followed by breaking the vacuum with nitrogen or a similar inert gas.

The method of this invention is illustrated by the following examples.

EXAMPLE 1

A 200-gram portion of a fumed silica having a surface area of 200 m$^2$/g and containing about 4.5 silanol groups per square nanometer was charged to a 1-gallon autoclave and 4 grams of 88% aqueous formic acid was added. The autoclave was sealed and heated to 174° C., with vigorous agitation. Volatiles were vented off and 32 grams of hexamethyldisilazane was added with the aid of a slight positive nitrogen pressure. Heating at that temperature was continued for 15 minutes, after which the autoclave was evacuated to strip volatiles. The product was the desired hydrophobic silica having a silanol group level of 2.4 per square nanometer.

EXAMPLE 2

To a 3.8-l laboratory autoclave reactor was charged 200 g of fumed silica containing about 1.5 silanol groups per square nanometer. Formic acid, 1 g, was added at 25° C. The reactor was sealed and heated to 150° C. The unabsorbed formic acid vapor was vented off and 8 g of hexamethyldisilazane was added. The reaction was allowed to proceed for 3 minutes and vacuum was immediately applied to strip off excess reagent. The treated filler was characterized by FTIR and silicon-29 nuclear magnetic resonance spectroscopy and elemental analysis, and it was found that all of the silanol groups had been removed.

EXAMPLE 3

A LPNC was synthesized from phosphorus pentachloride and ammonium chloride in tetrachloroethane as solvent. It was precipitated and collected by filtration under nitrogen. A solution of 15.56 grams of the LPNC was dissolved in 400 ml of methylene chloride which had been dried over phosphorus pentoxide and molecular sieves. The solution was filtered under nitrogen.

A 1-liter 3-necked flask fitted with a mechanical stirrer and reflux condenser with a vacuum take-off was charged with 50.7 grams of the fumed silica employed in Example 1 and 82.4 grams of hexamethyldisiloxane. The flask was heated with stirring until refluxing of the hexamethyldisiloxane began, after which 129 µl. of the catalyst solution was added by microsyringe.

Heating was continued and samples were periodically removed and tested for hydrophobicity with a 50% aqueous methanol solution. After 20 minutes the silica did not wet out when contacted with the methanol solution, demonstrating removal of all silanol groups. Volatiles were then vacuum stripped and the product, which was the desired hydrophobic silica, was dried for 2 hours in a vacuum oven at 110° C.

What is claimed is:

1. A method for treating inorganic powder comprising contacting it with a silylating agent in the presence of a further reagent selected from the group consisting of formic acid and linear phosphonitrilic halides, wherein the inorganic powder is silica, powdered glass, silicates, alumina, titania, aluminum, asbestos, barium sulfate, zinc oxide, ferric oxide, zinc sulfide or silver chloride.

2. A method according to claim 1 wherein the inorganic powder is amorphous silica.

3. A method according to claim 2 wherein the silica is fumed silica.

4. A method according to claim 2 wherein the proportion of silylating agent is at least a stoichiometric quantity based on the proportion of surface silanol groups in said silica.

5. A method according to claim 2 wherein the proportion of silylating agent is in the range of about 4–200% by weight based on silica.

6. A method according to claim 1 wherein the silylating agent has the formula the formula $[(R^1)_3Si]_aZ$, wherein each $R^1$ is independently an aromatic hydrocarbon, halogenated aromatic hydrocarbon, aralkyl, $C_{1-8}$ alkyl, $C_{2-8}$ alkenyl, $C_{1-8}$ haloalkyl or cycloalkyl; Z is hydroxy, —N $(R^2)_{2-A}$, —SR$^2$, —O—, —S— or OCOR$^2$; R$^2$ is hydrogen or R$^1$ and a is 1 or 2.

7. A method according to claim 6 wherein R$^1$ is hydrogen, lower alkyl or cycloalkyl.

8. A method according to claim 1 wherein the silylating agent is selected from the group consisting of triorganosilyl mercaptans, triorganosilyl acylates, triorganosilylamines, triorganosilylaminoxy compounds, disiloxanes and disilazanes.

9. A method according to claim 1 wherein the further reagent acid is formic acid.

10. A method according to claim 9 wherein the silylating agent is a disilazane.

11. A method according to claim 10 wherein the silylating agent is hexamethyldisilazane.

12. A method according to claim 1 wherein the further reagent is a linear phosphonitrilic chloride.

13. A method according to claim 12 wherein the silylating agent is a disiloxane.

14. A method according to claim 1 wherein the silylating agent is hexamethyldisiloxane.

15. A method according to claim 12 wherein said contact is at a temperature in the range of about 25°–400° C.

16. A method according to claim 1 wherein said contact is at a temperature in the range of about 100°–250° C.

* * * * *